United States Patent Office.

GEORGE W. TUCKER, OF MILWAUKEE, WISCONSIN, ASSIGNOR TO CLARENCE S. BROWN, OF SAME PLACE.

INSECTICIDE.

SPECIFICATION forming part of Letters Patent No. 258,507, dated May 23, 1882.

Application filed October 25, 1881. (No specimens.)

*To all whom it may concern:*

Be it known that I, GEORGE W. TUCKER, of Milwaukee, in the county of Milwaukee, and in the State of Wisconsin, have invented certain new and useful Improvements in Vermin-Exterminators; and I do hereby declare that the following is a full, clear, and exact description thereof.

My invention consists in a composition of matter especially intended for the extermination of cockroaches, water-bugs, and other noxious insects, and also rats, mice, and all vermin generally, as will be more fully set forth hereinafter.

The principal ingredients employed by me are honey, phosphorus, and rye-flour, to which I add glycerine or analogous material to keep the whole moist and plastic; and in order to render my compound more effective and certain with the larger kind of vermin I also add a small proportion of strychnine.

In preparing, say, thirty pounds of my compound I proceed as follows: I take about ten pounds of strained honey, to which I add (under water) as much phosphorus as the honey will absorb—about seven pounds. To this mixture I next add about ten pounds of rye-flour. This would serve for the destruction of the insects; but it would rapidly dry up and soon become useless, and so I add about three pounds of glycerine or analogous material, which serves to render the whole of a plastic or pasty consistence; and in order that the compound may work quickly upon rats, mice, or similar large vermin I also add a small quantity (say about two or three ounces) of strychnine, and my exterminator is complete.

This compound will keep soft and moist for an indefinite period. It is sure, safe, and substantially harmless to all except the vermin for whose destruction it is intended. It can be spread on painted surfaces without detriment thereto or without impairing its qualities, and it not only frees a house of all vermin, no matter how greatly infested, but it also acts as a preventive, keeping them out permanently.

I am aware that phosphorus and strychnine are common ingredients in rat poisons, together with various sweetening compounds, and lay no claim to such, either broadly or specifically, separately or in combination with each other.

Having thus described my invention, what I claim as new, and desire to secure by Letters Patent, is—

1. In a compound for exterminating vermin, the combination of honey, phosphorus, and rye-flour, as set forth.

2. In a compound for exterminating vermin, the combination of honey, phosphorus, rye-flour, and a substance for keeping the compound in a moist and plastic condition, as set forth.

In testimony that I claim the foregoing I have hereunto set my hand this 22d day of October, 1881.

GEORGE W. TUCKER.

Witnesses:
STANLEY S. STOUT,
HAROLD G. UNDERWOOD.